United States Patent [19]

Cannady

[11] Patent Number: 4,543,344

[45] Date of Patent: Sep. 24, 1985

[54] SILICON NITRIDE-CONTAINING CERAMIC MATERIAL PREPARED BY PYROLYSIS OF HYDROSILAZANE POLYMERS FROM $(R_3SI)_2NH$ AND $HSICL_3$

[75] Inventor: John P. Cannady, Midland, Mich.

[73] Assignee: Dow Corning Corporation, Midland, Mich.

[21] Appl. No.: 689,258

[22] Filed: Jan. 7, 1985

Related U.S. Application Data

[62] Division of Ser. No. 555,755, Nov. 28, 1983.

[51] Int. Cl.[4] ............................................. C04B 35/58
[52] U.S. Cl. ....................................... 501/92; 264/63; 264/65; 423/344; 501/95; 501/97
[58] Field of Search ............................ 501/92, 95, 97; 423/344; 264/63, 65

[56] References Cited

U.S. PATENT DOCUMENTS

| | | | |
|---|---|---|---|
| 3,853,567 | 12/1974 | Verbeek | 501/92 |
| 3,892,583 | 7/1975 | Winter et al. | 501/92 |
| 4,312,970 | 1/1982 | Gaul | 526/279 |
| 4,340,619 | 7/1982 | Gaul | 427/228 |
| 4,397,828 | 8/1983 | Seyferth et al. | 423/344 |

*Primary Examiner*—Helen M. McCarthy
*Attorney, Agent, or Firm*—Richard A. Kaba

[57] ABSTRACT

A process is disclosed for preparing $R_3SiNH$-containing hydrosilazane polymer by contacting and reacting trichlorosilane with a disilazane $(R_3Si)_2NH$ where R is vinyl, hydrogen, phenyl, or alkyl radicals containing 1 to 3 carbon atoms. These hydrosilazane polymers are useful, when fired at high temperatures, in the formation of silicon nitride and silicon nitride-containing ceramic materials.

24 Claims, No Drawings

SILICON NITRIDE-CONTAINING CERAMIC MATERIAL PREPARED BY PYROLYSIS OF HYDROSILAZANE POLYMERS FROM (R₃SI)₂NH AND HSICL₃

This is a divisional of co-pending application Ser. No. 555,755 filed on Nov. 28, 1983.

BACKGROUND OF INVENTION

This invention relates to the preparation of hydrosilazane polymers by the reaction of disilazanes with trichlorosilane, $HSiCl_3$. Such polymers are useful, when fired at high temperatures, in the formation of silicon nitride and silicon nitride-containing ceramic materials.

What is disclosed herein is a novel process to obtain novel hydrosilazane polymers which consists of contacting $HSiCl_3$ with disilazanes in an inert, essentially anhydrous atmosphere while distilling volatile by-products.

As is well known in the art, halosilane monomers will react with ammonia and most organic compounds containing a primary or secondary amino group to give a variety of silazanes. For example, the reaction of trimethylchlorosilane and ammonia produces hexamethyldisilazane, a silazane monomer, while dimethyldichlorosilane and ammonia produce dimethylcyclic silazanes.

Silazanes in general have been academic curiosities for many years and a variety of such silazanes, including monomers, oligomers, cyclics and even low molecular weight resins and linear polymers have been prepared by a variety of methods. For example, L. W. Breed et al. in *J. Org. Chem.*, 27, 1114(1962) report the formation of silazanes from the polymerization of sterically hindered silazane oligomers. In *J. Polym. Sci. A*, 2, 45(1964), cyclic trimer and tetramer silazanes are reported to be thermally cracked, using catalysts, to give linear polymers.

In contrast, fluids, rubbery polymers and resins prepared from $CH_3SiCl_3$, $(CH_3)_2SiCl_2$ and excess ammonia have been reported by Kruger et al. in *J. Polym. Sci. A*, 2, 3179(1964) and by Redl in "Silazane Polymer", ARPA-19, Advanced Research Projects Agency, October, 1965.

The patent literature also contains disclosures of the preparation of silazanes. Cheronis in U.S. Pat. No. 2,564,674 (Aug. 21, 1951) discloses the preparation of low molecular weight linear silazane polymers by the reaction of halosilanes with excess ammonia in a solvent solution. Bausma et al. in U.S. Pat. No. 3,809,713 (May 7, 1974) discloses a similar reaction scheme with the added modification of removing the by-produced solid ammonium halide using ethylene diamine.

Verbeek et al. in U.S. Pat. No. 3,853,567 (Dec. 10, 1974) and U.S. Pat. No. 3,892,583 (July 1, 1975) disclosed that mixtures of $CH_3SiCl_3$ and $(CH_3)_2SiCl_2$ can be treated with ammonia or organoamines to form materials that can be pyrolyzed to yield $SiC/Si_3N_4$ ceramics.

In another segment of the prior art, the use of disilanes in the preparation of silazane polymers has been limited to the formation of relatively low molecular weight materials. In one example, Wannagat et al., *Ang. Chem.* 75(7), 345(1963), reported the reaction of tetramethyldichlorodisilane with gaseous ammonia to give a six-membered cyclic silazane, $[(CH_3)_2SiSi(CH_3)_2NH]_2$, rather than the expected linear silazane polymer. Hengge et al., *Montash. Chem.* 101(2), 325(1970), prepared dimethylamino substituted mixtures of disilanes from dimethylamine and a chlorine-containing disilane mixture obtained from the direct process for the preparation of chlorosilanes.

More recently, Gaul in U.S. Pat. Nos. 4,312,970 (Jan. 26, 1982) and 4,340,619 (July 20, 1982) has disclosed processes for preparing silazane polymers by reacting disilazane with either organochlorosilanes or chlorine-containing disilanes. The organochlorosilanes of U.S. Pat. No. 4,312,970 are described by the formula $R_n'SiCl_{4-n}$ where $R'$ is a vinyl radical, an alkyl radical of 1-3 carbon atoms, or a phenyl radical and n has a value of 1 or 2. The chlorine-containing disilanes of U.S. Pat. No. 4,340,619 are described by the general formula $(Cl_aR_b'Si)_2$ where $R'$ is a vinyl radical, an alkyl radical of 1-3 carbon atoms, or a phenyl radical and where a has a value of 0.5-3, b has a value of 0-2.5, and the sum (a+b) is three. Ceramic materials prepared by firing the preceramic silazane polymers of Gaul at elevated temperatures under an inert atmosphere contained mainly silicon carbide as the crystalline phase. Silicon nitride, if found at all, was present in only minor amounts.

Seyferth et al. in U.S. Pat. No. 4,397,828 (Aug. 9, 1983) disclosed the preparation of relatively stable, liquid polymers containing silicon, nitrogen, and hydrogen which were formed by reacting dihydrodihalosilane such as $H_2SiCl_2$ with ammonia in the presence of a solvent comprising an aliphatic ether, a chloromethane, or mixtures thereof. The method of Seyferth et al. produces rather large quantities of the troublesome by-product ammonium chloride. The liquid polymers were stable, under an inert atmosphere, for at least 7 days at 0° C. but began to gel at room temperature after only 2 days. The liquid polymers of Seyferth et al., upon being fired to elevated temperatures under an inert atmosphere, yielded silicon nitride containing materials.

What has been newly discovered is the coreaction between trichlorosilane and disilazanes to give useful high molecular weight hydrosilazane polymers. The hydrosilazane polymers represent a significant advancement over prior art materials.

THE INVENTION

This invention relates to a process of preparing a $R_3SiNH$-containing hydrosilazane polymer, which process consists of contacting and reacting, in an inert, essentially anhydrous atmosphere, trichlorosilane with a disilazane at a temperature in the range of 25° to 300° C. while distilling by-produced volatile products, wherein said disilazane has the general formula

(R₃Si)₂NH where R is selected from the group consisting of vinyl, hydrogen, phenyl, and alkyl radical containing 1 to 3 carbon atoms.

This invention also relates to a new and novel composition of matter which is a $R_3SiNH$-containing hydrosilazane polymer which is prepared by contacting and reacting, in an inert, essentially anhydrous atmosphere, trichlorosilane with a disilazane at a temperature in the range of 25° to 300° C. while distilling by-produced volatile products, wherein said disilazane has the general formula

(R₃Si)₂NH where R is selected from the group consisting of vinyl, hydrogen, phenyl, and alkyl radicals containing 1 to 3 carbon atoms.

This invention further relates to a method of preparing a silicon nitride-containing ceramic material which method consists of heating a R₃SiNH-containing hydrosilazane polymer in an inert atmosphere or in a vacuum to a temperature of at least 750° C. until said R₃SiNH-containing hydrosilazane polymer is converted to a silicon nitride-containing ceramic material, said hydrosilazane polymer having been obtained by a process which consist of contacting and reacting, in an inert, essentially anhydrous, atmosphere, trichlorosilane with a disilazane at a temperature in the range of 25° to 300° C. while distilling by-produced volatile products, wherein said disilazane had the general formula (R₃Si)₂NH where R is selected from the group consisting of hydrogen, vinyl, hydrogen, phenyl, and alkyl radicals containing 1 to 3 carbon atoms, and phenyl.

The present invention concerns a new class of silazane polymers prepared from disilazanes and trichlorosilane. The chlorine-containing silane is treated with a disilazane, as the nitrogen source, in sufficient amounts to react with all of the chlorine in the chlorine-containing silane. This is usually an equimolar amount based on the chlorine content of the trichlorosilane. The inventor does not wish to be held to such a theory but it is believed that when the mixture containing trichlorosilane and disilazane is heated, in an inert essentially anhydrous atmosphere and usually in the absence of solvent, the reaction =Si(H)Cl + R₃SiNHSiR₃ → =Si(H)NHSiR₃ + R₃SiCl takes place. The R₃SiCl which is produced during the reaction is removed by distillation as the reaction proceeds. As the temperature of the reaction mixture is raised, condensation reaction begins to occur, causing formation of a higher molecular weight hydrosilazane and [R₃Si]₂NH. The [R₃Si]₂NH is also distilled from the reaction as it is formed.

2=Si(H)NHSiR₃ → =Si(H)NHSi(H)= + [R₃Si]₂NH

As higher temperatures are reached, more crosslinking occurs and any R₃SiNH— left in the polymer acts as an endblocker. This method permits one to stop the reaction at any point to obtain almost any desired viscosity. The hydrosilazane polymers range in physical appearance from high viscosity liquids to solid materials. The materials are therefore very easy to handle.

The present invention involves the reaction of trichlorosilane, HSiCl₃, with certain disilazanes to produce hydrosilazane polymers. These hydrosilazane polymers may be fired to obtain silicon nitride-containing ceramic polymers. It is preferred that the chlorosilane reactant be purified before it is reacted with the disilazane. It appears that some component, possibly a hydrolysis product, in aged chlorosilane reactants is detrimental to the process of this invention. Such contaminated chlorosilane reactants can be suitably purified by distillation. Other purification methods may also be employed. It is also preferred that the reactants be added in such a manner that the initial reaction exotherm is kept to a minimum. One reactant may be added slowly to the other reactant, or the added reactant may be cooled, or the reaction vessel may be cooled to keep the reaction exotherm low. Other methods or combination of methods may also be used. In general, it is preferred that the reaction be controlled such that the initial reaction temperature due to the exotherm is less than about 50° C., and most preferably, less than 35° C. In general, more reproducible results are obtained when purified trichlorosilane is used and when the initial reaction exotherm is controlled carefully.

The second reactant in this invention is a disilazane of the general formula (R₃Si)₂NH. R in this formula is vinyl, hydrogen, phenyl or alkyl radical of 1–3 carbon atoms. Therefore, R for purposes of this formula is represented by hydrogen, methyl, ethyl, propyl, vinyl or phenyl. As set forth above, each R group in this formula can be the same or they can be different. Examples of compounds contemplated within the scope of this invention include:
[(CH₃)₃Si]₂NH, [C₆H₅(CH₃)₂Si]₂NH,
[(C₆H₅)₂CH₃Si]₂NH, [CH₂=CH(CH₃)₂Si]₂NH,
[CH₂=CH(CH₃)C₆H₅Si]₂NH,
[CH₂=CH(C₆H₅)₂Si]₂NH,
[CH₂=CH(C₂H₅)₂Si]₂NH, [H(CH₃)₂Si]₂NH and
[(CH₂=CH(C₆H₅)C₂H₅Si]₂NH.

These reactants are brought together in an inert, essentially anhydrous atmosphere. For purposes of this invention what we mean by "inert" is that the reaction is carried out under a blanket of inert gas, such as argon or nitrogen or helium. What we mean by "essentially anhydrous" is that the reaction is preferably carried out in an absolutely anhydrous atmosphere but minute amounts of moisture can be tolerated.

When the reactants are contacted with each other, the reaction begins which forms an intermediate amino compound. As noted earlier, it is preferred that the reactants are contacted in such a manner to keep the initial reaction exotherm to a minimum. Upon heating, additional amino compound is formed and, upon continued heating, R₃SiCl is distilled from the reaction mixture and a hydrosilazane polymer is formed. For best results the rate of heating should be controlled at a rate of less than about 1.0° C./min. A heating rate of about 0.5° C./min or less is preferred. The order of addition of the materials does not appear to be critical. As the temperature is raised more condensation takes place and crosslinking occurs with residual R₃Si— that is not distilled from the mixture also acting as a chain-stopper. The desirable temperature range for this reaction is 25° C. to 300° C. A preferred temperature range for this reaction is 125°–275° C. The length of time that the reaction requires depends on the final temperature of the reaction and the rate of heating. The reaction may be held at the final temperature for varying lengths of time if desired.

What is meant by "volatile products" are the distillable by-produced products that are formed by the reactions set forth above. These materials can be represented by (CH₃)₃SiCl, (CH₂=CH)(C₆H₅)₂SiCl, CH₃(C₆H₅)₂SiCl, (CH₃)₂C₆H₅SiCl and (CH₂=CH)(CH₃)₂SiCl. Sometimes, these materials require the use of a vacuum along with heat in order to remove them from the reaction mixture.

The hydrosilazane polymers are essentially ready to use. It is preferred, however, that the hydrosilazane polymers be vacuum stripped prior to use in order to remove volatile materials. Using the vacuum strip procedure usually results in a solid hydrosilazane polymer which is easy to handle in further processing steps. The hydrosilazane polymers are pyrolyzed in an inert atmosphere or in a vacuum at temperatures of at least 750° C. to give silicon nitride-containing material. If the polymer is of sufficient viscosity or if it possesses a sufficiently low melt temperature, it can be shaped first (such as an extruded fiber) and then pyrolyzed to give a silicon nitride-containing fiber. The hydrosilazane polymers can be filled with ceramic type fillers (if desired) and then fired to at least 750° C. to obtain silicon nitride ceramic materials or silicon nitride ceramic material-containing ceramic articles.

The polymers of this invention can be used in both the filled and unfilled state, depending on the application. Thus, it is contemplated within the scope of this invention to coat substrates with filled and unfilled polymers and heat the substrates to produce silicon nitride-containing ceramic coated articles. Fillers and adjuvants can be milled on 3 roll mills by simply mixing the hydrosilazane polymers of this invention with the fillers and making several passes on the mill. In the alternative, the polymers can be placed in solvents and the fillers and adjuvants can be added thereto and after mixing the solvent can be removed to give the filled polymer. The coating can be carried out by conventional means. The means used depends on the polymer and substrates used and the application one has in mind. Thus, these materials can be brushed, rolled, dipped or sprayed. In the filled state, it is sometimes necessary to trowel the polymer onto the substrate.

Whenever the polymers are converted to the ceramic state, it is done by pyrolyzing the polymer to a temperature of at least 750° C. in an inert atmosphere or in a vacuum.

So that those skilled in the art can better appreciate and understand the invention, the following examples are given. Unless otherwise indicated, all percentages are by weight.

In the following examples, the analytical methods used were as follows:

Percent Silicon was determined by a fusion technique which consisted of converting the silicon material to soluble forms of silicon and then analyzing the soluble material quantitatively for total silicon by atomic absorption spectrometry. Solubilization takes place by weighing the sample into a Parr-type fusion cup (about 0.3 gm), adding 15.0 gms of sodium peroxide, heating for about 90 sec. and quenching in cold water. The material is placed in a nickel beaker containing 150-200 ml. of distilled water. Reagent grade acetic acid (55 ml.) is added and diluted with water to 500 ml. volume.

Percent Chlorine (residual) was determined by sodium peroxide decomposition and titration with silver nitrate. Fusion of the halides with sodium peroxide is followed by potentiometric titration with standard silver nitrate by weighing a sample into a gelation capsule, placing about 1.5 gm. of $Na_2O_2$, about 0.7 gm of $KNO_3$ and about 0.15 gm of sugar into a clean, dry reaction cup and burying the capsule in the mixture. The cup is filled with $Na_2O_2$ and placed in a reaction vessel. It is heated for $11\frac{1}{2}$ min. and quenched in cold water. The cup and vessel are washed and the washings are collected. The washings are heated to dissolve any solids. Cold 50% aqueous $H_2SO_4$ (15 ml.) is added and allowed to stand 15-20 sec. This solution is neutralized with additional $H_2SO_4$ and tritrated.

Carbon, hydrogen, and nitrogen were determined on a C, H, N Elemental Analyzer, model 1106, manufactured by Carlo Erba Strumentazione of Italy. The sample was combusted at 1030° C. and then passed over a chromium oxide bed at 650° C. and a copper bed at 650° C. The $N_2$, $CO_2$, and $H_2O$ produced were then separated and detected using a thermal conductivity detector.

The hydrosilazane polymers were fired to elevated temperature using an Astro Industries Furnace 1000A water cooled graphite heated model 1000.3060-FP-12. Samples fired to 1600° C. were heated in a inert atmosphere using the following temperature program: 25° to 380° C. at 2.9° C./min.; 380° to 600° C. at 2.6° C./min.; 600° to 850° C. at 5.2° C./min.; 850° to 1600° C. at 31.3° C./min.; hold at 1600° C. for 12 minutes; followed by cooling at a rate of about 13° C./min. Hydrosilazane polymers fired at 1300° C. were heated in an inert atmosphere using the following temperature program: rapid heating to 740° C.; 740° to 800° C. at 0.83° C./min; 800°-1300° C. at 2.1° C./min; followed by cooling.

EXAMPLE 1

The reaction system consisted of a 2 liter, 3-neck glass flask equipped with a heating mantle, a temperature controller, a paddle stirrer, a distillation apparatus, and a gas inlet tube. After purging the system with argon, 800 g of $[(CH_3)_3Si]_2NH$ (5 moles) and 300 g $HSiCl_3$ (2.2 moles) were added to the reaction system at room temperature. The mixture exothermed to about 75° C. The reactants were then heated to 230° C. at a rate of about 0.5° C./minute under an argon atmosphere. The temperature was held at 230° C. for about 10 minutes. The product was allowed to cool to about 140° C. under argon at which time the product was vacuum stripped at 150° C. and 37 mm Hg. After backfilling with argon the hydrosilazane polymer was heated to 180° C., poured into argon blanketed containers, and then cooled overnight under argon. A polymer yield of about 190 g was obtained. The polymer was a clear light yellow solid which could be shaped with pressure. IR analysis showed the presence of SiH, $Si(CH_3)_3$, and SiCl groups. The total chloride content was less than 0.08 percent. The silicon content was 48.0 percent. The C, H, N analysis gave C at 22.7 percent, H at 7.8 percent, and N at 21.5 percent.

A melt rheometer with a $\frac{3}{8}$ inch heat barrel and 20 micron spinneret was employed to prepare fibers from this hydrosilazane polymer. The best fibers were prepared at about 70° C.

A sample of the hydrosilazane polymer was fired to 1600° C. under helium in the Astro furnace. A dark green ceramic material was obtained with a yield of 53.1 percent. X-ray analysis gave 35 percent $\alpha$-$Si_3N_4$ with no $\beta$-SiC detected. The ceramic product contained 62 percent silicon.

Samples of the hydrosilazane polymer were stored at room temperature in bulk form under argon and then fired in the Astro furnace after varying storage times. Physical changes, including solubility in organic solvents such as toluene, were not observed after storage for the indicated times.

| SAMPLE | STORAGE TIME (DAYS) | FIRING CONDITIONS ATMOSPHERE | TEMP(°C.) | CERAMIC YIELD (%) | APPEARANCE |
|---|---|---|---|---|---|
| A | 40 | Helium | 1600 | 52.8 | green-black |
| B | 50 | Nitrogen | 1600 | 53.7 | green-black |
| C | 56 | Helium | 1600 | 59.3 | black |
| D | 64 | Helium | 1600 | 55.5 | gray-black |

Sample A contained 43 percent $\alpha$-$Si_3N_4$ and 13 percent $\beta$-SiC by X-ray analysis. Sample B contained about 43 percent $\alpha$-$Si_3N_4$ and about 15 percent $\beta$-SiC.

EXAMPLE 2

Using the same materials and procedures as in Example 1, except as noted, 400 g (2.5 moles) of $[(CH_3)_3Si]_2NH$ and 150 g (1.1 moles) $HSiCl_3$ were reacted. The reaction mixture was heated to 190° C. at a rate of 0.5° C./minute and then cooled to room temperature overnight. The material was a clear yellow liquid of moderately high viscosity. Heating of this material was continued at a rate of 0.5° C./minute up to a final temperature of 260° C. The temperature was held at 260° C. for about 5 minutes. Still under argon, the reaction mixture was cooled to about 100° C. The mixture was now a clear light yellow, extremely viscous, gum-like material. A product was obtained by vacuum stripping at 200° C. and 5 mm mercury pressure. Upon cooling to room temperature under argon, a light yellow solid which cracked under pressure was obtained. This material was not flowable even at 250° C.

EXAMPLE 3

Several runs were made with the same $HSiCl_3$ sample used in Example 1 except that the $HSiCl_3$ sample had been opened to the atmosphere several times. Using the same disilazane and procedure as given in Example 1, the reaction did not proceed as expected but rather began to foam and gel as the reaction temperature went above about 215° C. Satisfactory polymers were not prepared when the reaction mixture foamed and gelled at elevated temperature.

Several attempts were made to overcome this problem by adding the $HSiCl_3$ at dry ice/acetone temperatures and at such a rate to keep the initial temperature due to the reaction exotherm below about 35° C. When the reaction temperature was raised above about 225° C. foaming, followed by gellation, again occurred.

Finally the $HSiCl_3$ was purified by simple distillation. The glass distillation apparatus was dried overnight with a dried argon purge. The middle 80 percent of the overhead material was collected and stored under an argon atmosphere. Gas liquid chromatography analysis indicated that the sample was greater than 99.7 percent $HSiCl_3$.

A hydrosilazane polymer was prepared using this purified $HSiCl_3$ and the disilazane employed in Example 1. The apparatus and procedures, except as noted, were as described in Example 1. Purified $HSiCl_3$ (140.5 g, 1.04 mole) at dry ice/acetone temperature was added slowly to 375 g (2.3 moles) of $[(CH_3)_3Si]_2NH$. The $HSiCl_3$ addition took place over about 45 minutes during which time the reaction temperature rose to about 32° C. The reaction mixture was stirred at room temperature under argon overnight. The temperature was then raised to 245° C. at a rate of 0.5° C./minute. No significant foaming was observed. After the reaction mixture reached 245° C. the mixture was cooled to about 170° C. and then vacuum stripped at a pressure of about 45 mm mercury. The product was collected and cooled overnight under argon. The product was a clear, very light yellow solid. Although the material could be shaped somewhat with pressure there was some tendency to crack.

The polymer was evaluated in a similar spinning apparatus as described in Example 1 using a 20 micron spinneret. Continuous fibers could be prepared at temperatures from about 83° C. to 92° C. Spinning temperatures above 92° C. were not evaluated.

A number average molecular weight of about 1700 g/mole for the hydrosilazane polymer was determined by vapor pressure osmometry using tetrahydrofuran as solvent.

Samples of the hydrosilazane polymer, which had been stored in bulk form at room temperature under argon, were fired in the Astro furnace after varying storage times. No physical changes, including solubility in organic solvents such as toluene, were observed after storage for the indicated times.

| SAMPLE | STORAGE TIME (DAYS) | FIRING CONDITIONS ATMOSPHERE | TEMP(°C.) | CERAMIC YIELD (%) | APPEARANCE |
|---|---|---|---|---|---|
| A | 17 | Helium | 1600 | 55.2 | green-black |
| B | 37 | Helium | 1300 | 59.0 | shiny-black |
| C | 148 | Helium | 1600 | 54.4 | green-black |

According to X-ray analysis Sample A contained 63 percent $\alpha Si_3N_4$ and 22 percent $\beta SiC$. Sample C contained 56 percent $\alpha Si_3N_4$ and 5 percent $\alpha SiC$.

EXAMPLE 4

This example demonstrates the preparation of a hydrosilazane polymer from $[H(CH_3)_2Si]_2NH$ and $HSiCl_3$. Both the disilazane and chlorosilane were purified by distillation prior to use. The apparatus and procedures were essentially as described in Example 1. Purified $HSiCl_3$ (30.0 g, 0.22 moles), at room temperature, was quickly added to $[H(CH_3)_2Si]_2NH$ (75.2 g, 0.57 moles). The temperature quickly rose to about 55° C. The temperature was increased at a rate of 0.5° C./minute to 235° C. The reaction product was cooled to about 160° C. and then vacuum stripped at 170° C. and 14 mm mercury. A polymer yield of 18.3 g was obtained. The product was a viscous, cloudy oil with an estimated viscosity of several hundred centistokes at room temperature. IR analysis showed the presence of NH, SiH, Si-CH₃, and SiN groups in the polymer. A dark green ceramic powder was obtained upon firing this hydrosilazane to 1600° C. in a helium atmosphere. The ceramic yield was 48.3 percent. X-ray analysis of the ceramic gave 51 percent $\alpha Si_3N_4$ and 8 percent $\alpha SiC$. The ceramic powder contained 62.1 percent Si.

That which is claimed is:

1. A method of preparing a silicon nitride-containing ceramic material which method consists of heating a R₃SiNH-containing hydrosilazane polymer in an inert atmosphere or in a vacuum to a temperature of at least 750° C. until said R₃SiNH-containing hydrosilazane polymer is converted to a silicon nitride-containing ceramic material, said R₃SiNH-containing hydrosilazane polymer having been obtained by a process which consisted of contacting and reacting, in an inert, essentially anhydrous atmosphere, trichlorosilane with a disilazane at a temperature in the range of 25° to 300° C. while distilling by-produced volatile products, wherein said disilazane had the general formula (R₃Si)₂NH where R is selected from the group consisting of vinyl, hydrogen, phenyl, and alkyl radicals containing 1 to 3 carbon atoms.

2. A method as defined in claim 1 wherein said trichlorosilane was purified prior to contacting and reacting with said disilazane at a temperature in the range of 125° to 175° C.

3. A method as defined in claim 1 wherein said trichlorosilane and said disilazane were contacted in such a manner that the initial reaction temperature resulting from the initial exotherm was less than 50° C.

4. A method as defined in claim 2 wherein said trichlorosilane and said disilazane were contacted in such a manner that the initial reaction temperature resulting from the initial exotherm was less than 50° C.

5. A method as defined in claim 3 wherein the initial reaction temperature resulting from the initial exotherm was less than 35° C.

6. A method as defined in claim 4 wherein the initial reaction temperature resulting from the initial exotherm was less than 35° C.

7. A method as defined in claim 1 wherein (R₃Si)₂NH was [(CH₃)₃Si]₂NH.

8. A method as defined in claim 1 wherein (R₃Si)₂NH was [(CH₃)₂CH₂=CHSi]₂NH.

9. A method as defined in claim 1 wherein (R₃Si)₂NH was [CH₃(C₆H₅)₂Si]₂NH.

10. A method as defined in claim 1 wherein (R₃Si)₂NH was [C₆H₅(CH₃)₂Si]₂NH.

11. A method as defined in claim 1 wherein (R₃Si)₂NH was [H(CH₃)₂Si]₂NH.

12. A method as defined in claim 2 wherein (R₃Si)₂NH was [(CH₃)₃Si]₂NH.

13. A method as defined in claim 2 wherein (R₃Si)₂NH was [(CH₃)₂CH₂=CHSi]₂NH.

14. A method as defined in claim 2 wherein (R₃Si)₂NH was [CH₃(C₆H₅)₂Si]₂NH.

15. A method as defined in claim 2 wherein (R₃Si)₂NH was [C₆H₅(CH₃)₂Si]₂NH.

16. A method as defined in claim 2 wherein (R₃Si)₂NH was [H(CH₃)₂Si]₂NH.

17. A method as defined in claim 4 wherein (R₃Si)₂NH was [(CH₃)₃Si]₂NH.

18. A method as defined in claim 4 wherein (R₃Si)₂NH was [(CH₃)₂CH₂=CHSi]₂NH.

19. A method as defined in claim 4 wherein (R₃Si)₂NH was [CH₃(C₆H₅)₂Si]₂NH.

20. A method as defined in claim 4 wherein (R₃Si)₂NH was [C₆H₅(CH₃)₂Si]₂NH.

21. A method as defined in claim 4 wherein (R₃Si)₂NH was [H(CH₃)₂Si]₂NH.

22. A silicon nitride-containing ceramic material as prepared by the method of claim 1.

23. A silicon nitride-containing ceramic material as prepared by the method of claim 2.

24. A silicon nitride-containing ceramic material as prepared by the method of claim 4.

* * * * *